United States Patent [19]
Barnes

[11] Patent Number: 5,282,647
[45] Date of Patent: Feb. 1, 1994

[54] DEFLECTOR FOR AIR BAG DEPLOYMENT
[75] Inventor: William J. Barnes, Clarkston, Mich.
[73] Assignee: General Motors Corporation, Detroit, Mich.
[21] Appl. No.: 906,143
[22] Filed: Jun. 29, 1992
[51] Int. Cl.5 .............................................. B60R 21/22
[52] U.S. Cl. ..................................... 280/732; 180/90
[58] Field of Search ........... 280/728 R, 728 A, 728 B, 280/732, 752; 180/90; 296/70

[56] References Cited
U.S. PATENT DOCUMENTS

| 4,332,398 | 6/1982 | Smith | 280/732 |
| 4,925,209 | 5/1990 | Sakurai | 280/728 B |
| 4,964,653 | 10/1990 | Parker | 280/728 B |
| 5,035,444 | 7/1991 | Carter | 280/728 B |
| 5,161,819 | 11/1992 | Rhodes, Jr. | 280/728 B |

FOREIGN PATENT DOCUMENTS

| 4137926 | 5/1992 | Fed. Rep. of Germany | 280/728 B |
| 3-86653 | 4/1991 | Japan | 280/723 B |
| 4-191141 | 7/1992 | Japan | 280/743 |

Primary Examiner—Karin L. Tyson
Attorney, Agent, or Firm—Charles F. Leahy

[57] ABSTRACT

An air bag assembly in which a deflector plate is attached to the air bag housing and projects somewhat overtop the storage cavity and the folded air bag stored therein to partially obstruct the deployment opening of the housing so that the path of the deploying air bag is deflected by the engagement of the air bag with the deflector plate to direct the air bag away from engagement with the hinge mounting the door on the instrument panel.

2 Claims, 1 Drawing Sheet

DEFLECTOR FOR AIR BAG DEPLOYMENT

The invention relates to a vehicle air bag system and more particularly provides a deflector on the air bag housing to deflect the deploying air bag.

BACKGROUND OF THE INVENTION

It is well known in motor vehicles to mount an air bag within the instrument panel for deployment through an opening in the instrument panel. The opening in instrument panel is conventionally closed by a deployment door which is hingedly mounted on the instrument panel by a hinge defining a transversely extending hinge axis located at the forward end of the door. The rearward end of the door opens to permit deployment of the air bag toward the occupant.

The air bag is folded and stored in a housing mounted on the instrument panel and underlying the door opening. A gas generator underlies the air bag and inflates the air bag for deployment through the opening as permitted by hinging movement of the door about the hinge. The housing is defined by forward and rearward walls spaced apart by end walls to define a deployment opening in the housing. The size of the storage cavity defined by the housing is determined by the amount of volume needed to store the folded air bag.

The present invention provides a new and improved air bag assembly in which a deflector plate is attached to the air bag housing and projects somewhat overtop the storage cavity and the folded air bag stored therein to partially obstruct the deployment opening of the housing so that the path of the deploying air bag is deflected by the engagement of the air bag with the deflector plate to direct the air bag away from engagement with the hinge mounting the door on the instrument panel.

BRIEF DESCRIPTION OF THE DRAWINGS

These and other features, objects and advantages of the invention will became apparent upon consideration of the description of the preferred embodiment and appended drawings in which.

DESCRIPTION OF THE PREFERRED EMBODIMENT

Figure 1:
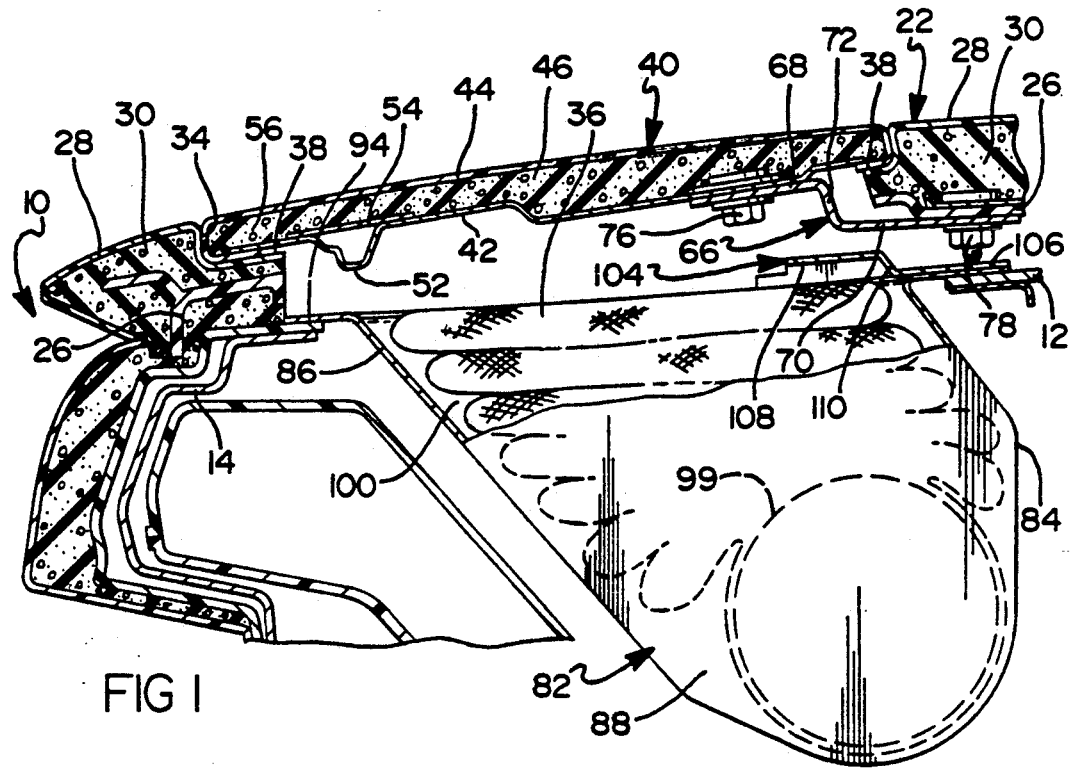
FIG. 1 is a section view through a vehicle instrument panel showing the air bag housing of this invention.

Referring to FIG. 1 it is seen that a vehicle body includes an instrument panel 10 supported by sheet metal stampings 12 and 14 which are suitably welded and bolted together to provide a rigid understructure. The panel 10 also has an instrument panel cover 22 which includes a molded plastic base panel 26, a layer of decorative trim 28, and a cushion of foam 30 which is molded in place between the base panel 26 and the decorative trim 28. The instrument panel 22 has a rectangular opening 34 therein through which an inflatable air bag 36 is deployed to restrain the vehicle occupant. The opening 34 has a shelf 38 extending around its periphery.

An air bag deployment door 40 is hingedly mounted on the instrument panel cover 22 to close the air bag opening 34. The deployment door 40 is comprised of a stamped sheet metal substrate panel 42 and a decorative trim cover 44 having a layer of foam 46 molded in place therebetween. The substrate panel 42 is generally rectangular in shape and underlies the entire extent of the door 40. A plurality of apertures, not shown, are displayed in a row along the panel 42 to weaken the door 40 in a manner which will permit folding and bending of the door during opening movement as more particularly described in my co-pending application Ser. No. 07/835,890 filed Feb. 14, 1992, now abandoned. In addition, the panel 42 has a transverse extending stiffening rib 52 struck downwardly therefrom and extending along the rearward edge of the door 40. A reinforcement plate 54 bridges across the reinforcing rib 52 and is suitably welded to the panel 42. The reinforcing rib 52 is spaced somewhat from the rearward most edge of the door 40 to define a rear tip portion 56 of the door. In addition a plurality of slightly raised ribs, not shown, may be provided in the substrate panel 42 and cooperate with the rib 52 to stiffen the door 40 somewhat against bending.

The deployment door 40 is hingedly mounted on the instrument panel by a hinge strap or panel 66. As best seen in FIG. 1, the hinge strap 66 is generally Z-shaped and includes a door leg 68 which extends to underlie the door panel 42, a vehicle leg 70 which extends into engagement with the base plate 26 of the instrument panel 10, and a vertical extending step 72 which connects door leg 68 and vehicle leg 70. The door leg 68 is attached to the substrate panel 42 of the door 40 by a plurality of nut and bolt assemblies 76. The vehicle leg 70 is similarly attached to the instrument base panel 26 by a plurality of nut and bolt assemblies 78.

Figure 2:
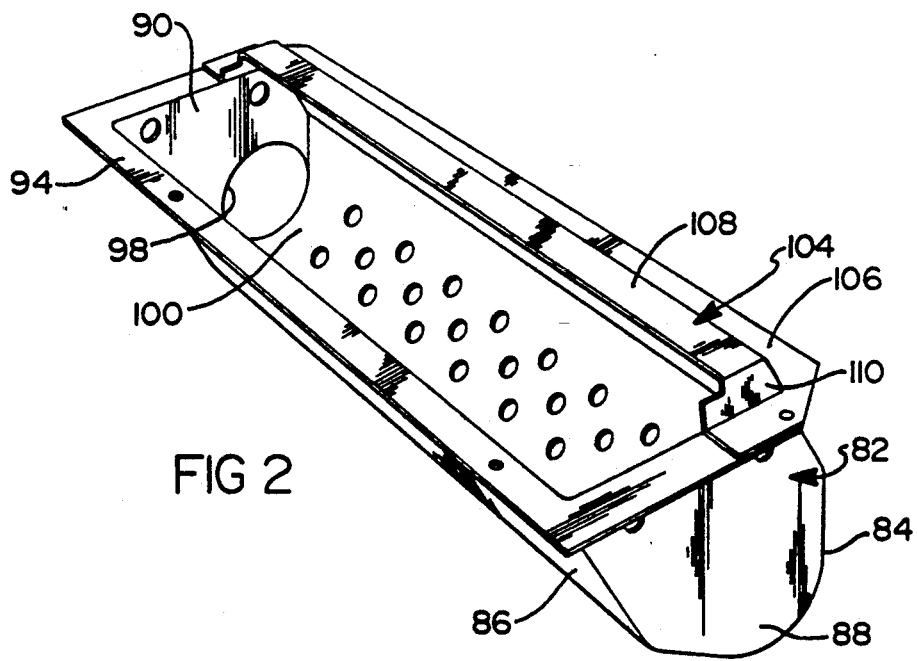
FIG. 2 is a perspective view of the air bag housing.

Referring again to FIGS. 1 and 2, it is seen that the air bag 36 is stored within an air bag housing 82. As best seen in FIG. 2, the air bag housing is of stamped metal construction and includes a forward wall 84 and a rearward wall 86 which are spaced apart by end walls 88 and 90. A flange structure 94 projects outwardly from the sidewalls 84 and 86 and the end walls 88 and 90 and extends around the periphery of the housing 82. The housing 82 may be constructed of a one piece stamping, or of several stampings which are welded together.

As best seen in FIG. 1, the forward wall 84 and the rearward wall 86 are preferably slanted somewhat rearwardly toward the occupant compartment so that the path of air bag deployment will generally underlie the opening 34 of the instrument panel 10 and the deployment door 40. As best seen in FIG. 2, the housing 82 has an end opening 98 through which a conventional gas generator 99 is inserted to underlie the folded air bag 36.

As best seen in FIG. 1, it will be appreciated that the volume of the air bag storage cavity 100 defined between the forward wall 84 and the rearward wall 86 must be sufficient to provide for storage of the folded air bag.

As best seen in FIG. 1, the housing 82 is conveniently mounted on the vehicle body instrument panel structure by the continuous flange 94 which overlies the stampings 12 and 14 of the rigid instrument panel understructure. Bolts, or other suitable fasteners, not shown, extend between the flange 94 and the stampings 12 and 14.

As seen in FIGS. 1 and 2 the present invention provides a deflector plate 104 for deflecting the path of the deploying air bag. The deflector plate 104 is a sheet metal stamping and includes a flange portion 106 and a deflector portion 108 which is raised from the flange 106 by step wall 110. The flange 106 is suitably attached, preferably by welding to the continuous flange 94 along and overtop the rear wall 84. As seen in FIG. 1 the deflector portion 104 projects rearwardly from the forward wall 84 to partially obstruct the deployment opening defined between the forward wall 84 and the rearward wall 86. Accordingly, the deflector portion 108 partially overhangs the folded air bag 36.

FIG. 1 shows the air bag 36 stored and the deployment door 40 in its normal predeployment closed position. Upon actuation of the gas generator, the air bag 36 is filled with inflation gas and begins to deploy. During such deployment of the air bag 36 out of the housing 82, the bag is deflected by the deflector portion 108 of the deflector plate 104 to direct the air bag 36 away from the hinged forward end of the deployment door 40 and more toward the rearward end of the deployment door. By deflecting the air bag energy more toward the rearward end of the door, the air bag deployment energy transfers less force through the hinge 66 and into the instrument panel cover 22. In addition, the use of the deflector plate 104 permits the housing 82 to define a relatively larger volume storage cavity for storing the folded air bag 36, and yet partially obstruct the deployment opening of the housing so that the bag is deployed through a relatively smaller opening than the opening otherwise defined between the forward wall 84 and rearward wall 86 of the housing.

It will be understood that the dimension of the deflector plate 104, particularly the degree to which the deflector portion 108 overhangs the folded air bag, will be determined depending on a multitude of variables including the size of the folded air bag, the distances between the forward wall 84 and rearward wall 86, the angular orientation of the walls 84 and 86, and the size and location of the deployment door 40 relative to the housing walls 84 and 86. Accordingly, while the deflector portion 104 is shown in the drawing of the preferred embodiment to overhang the canister by about 1 inch, a person of ordinary skill in the art will choose the amount of overhang to obtain the desired deployment path for the air bag.

Thus it is seen that the invention provides a new and improved air bag arrangement in which a deflector plate attached to the air bag housing overhangs the stored air bag to deflect the deploying air bag during deployment.

The embodiments of the invention in which an exclusive property or privilege is claimed are defined as follows:

1. In combination, a vehicle instrument panel having an opening therein, an air bag housing mounted on the vehicle and underlying the opening and having first and second walls spaced apart to define therebetween a storage cavity registering with the opening, a flange projecting from the walls outwardly away from the cavity and attached to the vehicle so that the housing is mounted with the storage cavity registering with the opening in the instrument panel, an air bag mounted on the housing and folded to store within the storage cavity between the first and second walls, a gas generator actuable to inflate the air bag and deploy the air bag through the opening, a door for closing the opening in the instrument panel to conceal the stored air bag and having a rigid substrate panel extending across the opening, said door having first and second ends respectively overlying the first and second walls of the housing, a hinge having one end attached to the first end of the door above the storage cavity and another end attached to the instrument panel so that the door is hingedly mounted for movement to an open position with respect to the opening when the actuation of the gas generator inflates the air bag, and a deflector plate having a flange portion attached to the housing flange along the first wall of the housing and a deflector portion raised above the flange portion by a step wall so that the deflector portion is parallel to the instrument panel and underlying the hinge and projecting toward the second wall to partially obstruct the deployment opening of the housing so that the path of the deploying air bag is deflected by the engagement of the air bag with the deflector plate to direct the air bag away from engagement with the hinge toward the second end of the door.

2. In combination, a vehicle instrument panel having an opening therein, an air bag housing having first and second walls spaced apart by end walls to defined therebetween a storage cavity registering with the opening, a flange projecting from the walls outwardly away from the cavity and attached to the vehicle so that the housing is mounted with the storage cavity registering with the opening in the instrument panel, an air bag mounted on the housing and folded to store within the storage cavity between the first and second walls, a gas generator actuable to inflate the air bag and deploy the air bag out of the storage cavity and through the opening, a door for closing the opening in the instrument panel to conceal the stored air bag and having a rigid substrate panel, said door having first and second ends respectively overlying the first and second walls of the housing, a hinge having one end attached to the first end of the door above the storage cavity and another end attached to the instrument panel so that the door is hingedly mounted for movement to an open position with respect to the opening when the actuation of the gas generator inflates the air bag, and a deflector plate fixedly attached to the flange of the housing at the first wall and extending uninterruptedly along the first wall and projecting inwardly from the first wall generally horizontally and in parallel spaced relation above the flange and below the hinge and sufficiently overtop the storage cavity and the folded air bag stored therein to partially obstruct the deployment opening of the housing so that the path of the deploying air bag is deflected by the engagement of the air bag with the deflector plate to direct the air bag away from engagement with the hinge mounting the first end of the door on the instrument panel.

* * * * *